(12) United States Patent
Haas et al.

(10) Patent No.: US 11,182,187 B2
(45) Date of Patent: Nov. 23, 2021

(54) DYNAMIC NETWORK CONNECTIVITY VERIFICATION IN DISTRIBUTED VIRTUAL ENVIRONMENTS

(71) Applicant: Red Hat Israel, Ltd., Ra'anana (IL)

(72) Inventors: Edward Haas, Ra'anana (IL); Alona Kaplan, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 224 days.

(21) Appl. No.: 15/955,577

(22) Filed: Apr. 17, 2018

(65) Prior Publication Data

US 2019/0317790 A1     Oct. 17, 2019

(51) Int. Cl.
  *G06F 9/455* (2018.01)
  *H04L 12/26* (2006.01)
  *H04L 12/24* (2006.01)

(52) U.S. Cl.
  CPC .......... *G06F 9/45558* (2013.01); *H04L 41/12* (2013.01); *H04L 41/22* (2013.01); *H04L 43/0811* (2013.01); *H04L 43/10* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 7,356,679 B1 * | 4/2008 | Le | G06F 9/45558 713/1 |
| 8,028,071 B1 * | 9/2011 | Mahalingam | H04L 69/32 370/254 |
| 8,032,883 B2 * | 10/2011 | Nakajima | G06F 9/45558 709/223 |
| 8,060,875 B1 * | 11/2011 | Lambeth | G06F 9/5077 709/223 |
| 8,291,412 B2 | 10/2012 | Sekiguchi et al. | |
| 8,775,590 B2 | 7/2014 | Devarakonda et al. | |
| 8,893,147 B2 | 11/2014 | Yin et al. | |
| 8,958,293 B1 | 2/2015 | Anderson | |

(Continued)

OTHER PUBLICATIONS

Huang et al, Network Hypervisors: Managing the Emerging SDN Chaos, IEEE, 2013 (Year: 2013).*

(Continued)

*Primary Examiner* — Abu Zar Ghaffari
(74) *Attorney, Agent, or Firm* — Womble Bond Dickinson (US) LLP

(57) ABSTRACT

An apparatus includes a memory of a host computing device. The memory is to store at least one hypervisor. The apparatus also includes a processing device of the host computing device and operatively coupled to the memory. The processing device is to receive a request to connect the hypervisor to a virtual network, and to determine whether the hypervisor is connectable to the virtual network utilizing at least one connectivity check service. The at least one connectivity check service indicates whether one or more connectivity requirements are satisfied. The processing device is to further connect the hypervisor to the virtual network when the one or more connectivity requirements are indicated as being satisfied, and to perform a periodic connectivity check of the connection between the hypervisor and the virtual network.

11 Claims, 5 Drawing Sheets

(56) References Cited

U.S. PATENT DOCUMENTS

| | | | | |
|---|---|---|---|---|
| 9,507,626 | B1* | 11/2016 | Tsirkin | G06F 9/45558 |
| 9,632,813 | B2* | 4/2017 | Radhakrishnan | G06F 11/0712 |
| 9,753,758 | B1* | 9/2017 | Oldenburg | G06F 9/45558 |
| 9,787,559 | B1* | 10/2017 | Schroeder | H04L 43/08 |
| 9,999,030 | B2* | 6/2018 | Gu | H04L 67/1095 |
| 10,318,335 | B1* | 6/2019 | Toy | G06N 5/022 |
| 10,644,948 | B1* | 5/2020 | Panda | G06F 9/5077 |
| 2008/0155537 | A1* | 6/2008 | Dinda | G06F 9/4887 718/1 |
| 2008/0298274 | A1* | 12/2008 | Takashige | H04L 12/4641 370/254 |
| 2009/0199177 | A1* | 8/2009 | Edwards | G06F 9/5077 718/1 |
| 2010/0031258 | A1* | 2/2010 | Takano | G06F 9/45558 718/1 |
| 2012/0059930 | A1* | 3/2012 | Devarakonda | H04L 43/0817 709/224 |
| 2012/0278802 | A1* | 11/2012 | Nilakantan | G06F 9/45558 718/1 |
| 2013/0034015 | A1 | 2/2013 | Jaiswal et al. | |
| 2013/0219384 | A1* | 8/2013 | Srinivasan | G06F 9/45558 718/1 |
| 2013/0239108 | A1* | 9/2013 | Lee | G06F 9/45558 718/1 |
| 2013/0332926 | A1* | 12/2013 | Jakoljevic | G06F 9/4887 718/1 |
| 2014/0282508 | A1* | 9/2014 | Plondke | G06F 12/109 718/1 |
| 2015/0378760 | A1* | 12/2015 | Su | G06F 9/45558 718/1 |
| 2016/0026490 | A1* | 1/2016 | Johnsson | H04L 45/74 718/1 |
| 2016/0248818 | A1* | 8/2016 | Fries | H04L 67/2814 |
| 2016/0253200 | A1* | 9/2016 | Ma | G06F 9/5077 718/1 |
| 2018/0262387 | A1* | 9/2018 | Mathew | G06F 9/45558 |
| 2019/0059117 | A1* | 2/2019 | Shu | H04W 76/50 |

OTHER PUBLICATIONS

Payne, "Dynamic Network Management", www.skytap.com/blog/dynamic-network-management/, Jun. 6, 2013.

Posey, "Rely on the Hypervisor for VM Load Balancing", searchservervirtualization.techtarget.com/tip/Rely-on-the-hypervisor-for-VM-load-balancing, Jul. 6, 2015.

* cited by examiner

DYNAMIC NETWORK CONNECTIVITY VERIFICATION IN DISTRIBUTED VIRTUAL ENVIRONMENTS

TECHNICAL FIELD

Aspects of the present disclosure relate to virtual computing environments, and more particularly, to dynamic network connectivity verification in virtual computing environments.

BACKGROUND

A virtual machine (VM) may be considered a software-based emulation of computer hardware. For example, the virtual machine may operate based on computer architecture and functions of the computer hardware resources. Thus, the virtual machine may emulate a physical computing environment, but requests for CPU, memory, hard disk, network, and other hardware resources may be managed by a virtualization layer which translates these requests to the underlying physical computing hardware resources.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Virtual machines (VMs) may be considered a software-based emulation of computer hardware, and may operate based on computer architecture and functions of the computer hardware resources. In some instances, when logically attaching the VMs to, for example, a virtual network (e.g., virtual local area network [VLAN]), certain administrators may make a number of assumptions. For example, the assumptions may include, for example in implementing a virtual network, that the virtual network is properly defined on the external and/or physical network (e.g., including that the correct tags defined on the relevant ports) supporting the host computing devices running the VMs. The assumptions may further include that any maximum transmission unit (MTU) requirements include proper connectivity paths, that all application connectivity defined by transmission control protocol (TCP)/user datagram protocol (UDP) includes proper ports, and further that virtual network is capable of supplying the desired bandwidth rate and connectivity quality. However, if any of the aforementioned assumptions are incorrect, the error may not become apparent until network connectivity untimely fails, such as a runtime of the VMs. It may be thus useful to provide techniques to test the connectivity retirements prior to connecting the VMs to the virtual network (e.g., VLAN), and to periodically check the connectivity state thereafter.

Accordingly, it may be useful to provide dynamic network connectivity verification techniques for use in virtual computing environments. By way of example, a host computing device running, for example, one or more hypervisors may receive a request to connect the hypervisor of the host computing device to a particular virtual network (e.g., VLAN). In certain embodiments, the hypervisor is determined to be connectable to the virtual network utilizing a network connectivity check service that checks and verifies that certain network connectivity requirements (e.g., application connectivity, bandwidth rate, connectivity quality, MTU connectivity path, aggregation, and so forth) are satisfied. Iterative periodic connectivity checks of the connection (e.g., virtual network attachment) between the hypervisors and the virtual network may then be performed to ensure that the network connectivity maintains a functional state. In this way, the present techniques may reduce or substantially eliminate the possibility of a connection between hypervisors and a virtual network (e.g., VLAN) becoming untimely inoperable or failing at, for example, runtime of the hypervisors.

Figure 1:
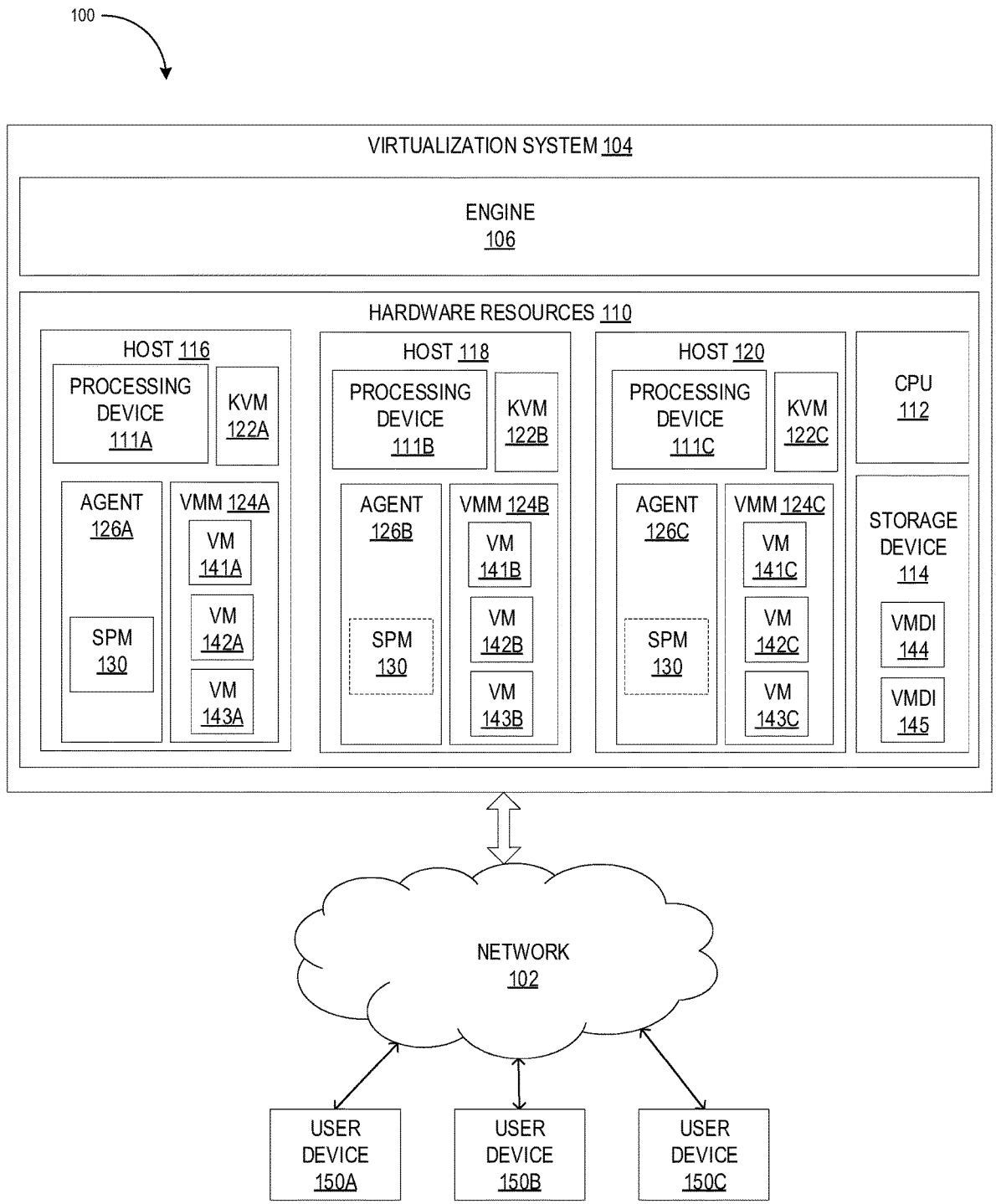
FIG. 1 is a block diagram illustrating a system architecture of a virtual computing environment, in accordance with the present embodiments.

With the foregoing in mind, FIG. 1 illustrates an example system architecture 100 in which embodiments of the disclosure may operate. The system architecture 100 may include a virtualization system 104 coupled to and accessible over a network 102 (e.g., VLAN) by a number of user devices 150A-150C. The virtualization system 104 includes a variety of hardware resources 110 which may include, but is not limited to, desktop computers, laptop computers, rackmount servers, routers, switches, tablet computers, mobile phones, or any other type of computing device. The hardware resources 110 may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources 110 may be used to execute software, including one or more operating systems, virtual machines, or other applications. The virtualization system may also include an engine 106 (which may execute on a portion of the hardware resources 110 or a separate engine device) that manages the hardware resources 110 and the processes running on the hardware resources 110.

The hardware resources 110 include a number of host computing devices 116, 118, and 120 (or host machines or systems) each including a portion of the hardware resources 110. The host computing devices 116, 118, and 120 may each include one or more processing devices and one or more storage devices. The hardware resources 110 may further include one or more additional processing devices 112 and one or more additional storage devices 114.

Each of the host computing devices 116, 118, and 120 includes a kernel space and a user space defined by the hardware resources of the host computing devices 116, 118, and 120. A kernel-based virtual machine (KVM) 122A-122C is executed in the kernel space of the host computing devices 116, 118, and 120. The KVM 122A-122C may allow the host computing devices 116, 118, and 120 to make its hardware resources available to virtual machines 141A-143C which may be executed in the user space.

Each of the host computing devices 116, 118, and 120 may execute a virtual machine monitor (VMM) 124A-124C (or a hypervisor). The VMM 124A-124C is an application that executes on a host computing devices 116, 118, and 120 to manage virtual machines 141A-143C. In particular, the VMM 124A-124C may instantiate or start, migrate, pause, or perform another type of event associated with virtual machines 141A-143C. The VMM 124A-124C may include a virtualization API and a multi-platform emulator. Each virtual machine 141A-143C may execute a guest operating system that can be accessed by a user device 150A-150C over the network 102 (e.g., VLAN). Each virtual machine 141A-143C may further run guest applications using the guest operating system.

Each of the host computing devices 116, 118, and 120 may include respective agents 126A, 126B, and 126C. The agents 126A, 126B, and 126C may include, for example, an administrator that may facilitate inter-host communication and perform various monitoring and administrative tasks. The agents 126A, 126B, and 126C may also include functionality for acting as a storage pool manager (SPM) 130. However, in some embodiments, one of the host computing devices 116 may be active as the SPM at any one time. The host computing device 116 may be designated an active SPM 130 by the engine 106. The SPM 130 coordinates metadata changes in the virtualization system 104, such as creating and deleting disk images, creating and merging snapshots, copying images between storage domains, creating templates and storage allocation for block devices of the hardware resources 110 such as hard drives or other storage devices. For example, a storage domain may include a collection of data structures that have a common storage interface, or may contain complete images of templates and virtual machines (including snapshots). The storage domain may also include one or more block devices, one or more storage devices, one or more file systems, one or more volumes, and/or portions thereof.

As shown in FIG. 1, each of the host computing devices 116, 118, and 120 may include processing devices 111A, 111B, and 111C. In some embodiments, the processing devices 111A, 111B, and 111C may execute, for example, general instructions scripts (e.g., which may also be referred to as hooks) that may include operations or commands to be performed on the virtual machines 141A-141C, 142A-142C, and 143A-143C. The processing devices 111A, 111B, and 111C may execute a stored set of specific instructions, for example, in response to an event associated with any of the virtual machines 141A-141C, 142A-142C, and 143A-143C. For example, the virtual machine 141A may be started or initiated on the host computing device 116 and the starting or initiating of the virtual machine 141A may be considered an event. In response to the event, the processing devices 111A of the host computing device 116 may execute the stored set of specific instructions.

Figure 2:
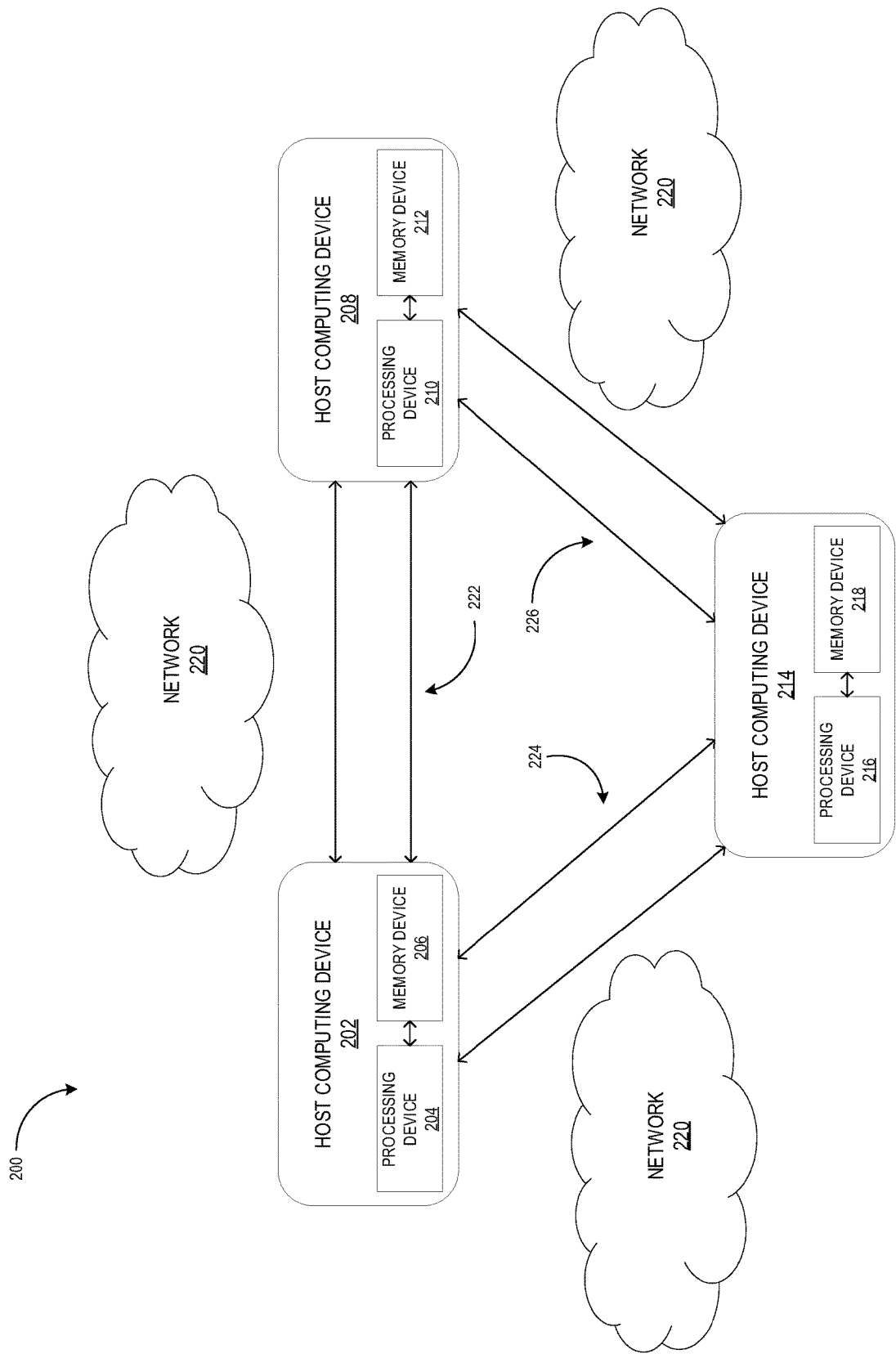
FIG. 2 is another block diagram illustrating an example virtual computing environment, in accordance with the present embodiments.
Figure 3:
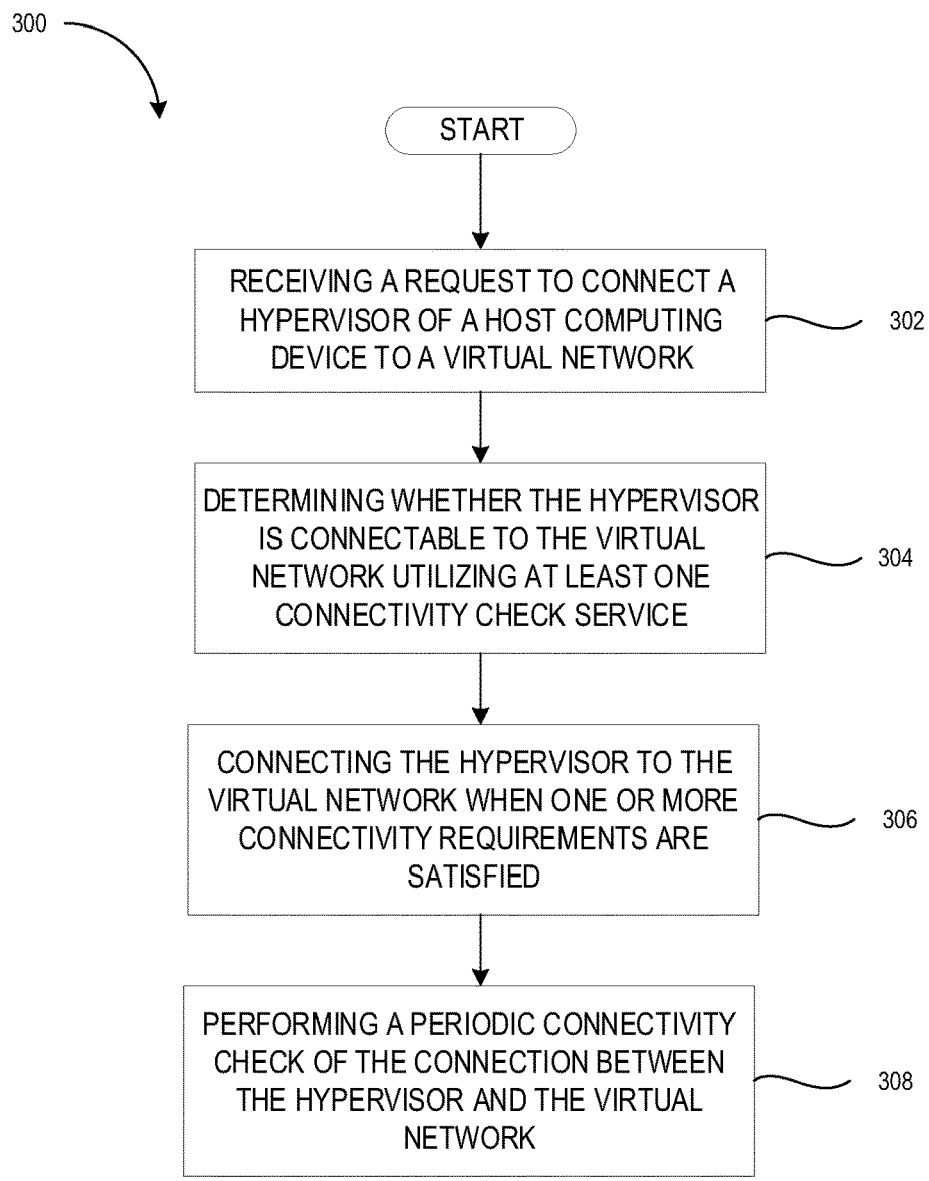
FIG. 3 is a flow diagram of a method of dynamic network connectivity verification in virtual computing environments, in accordance with some embodiments of the present disclosure.
Figure 4:
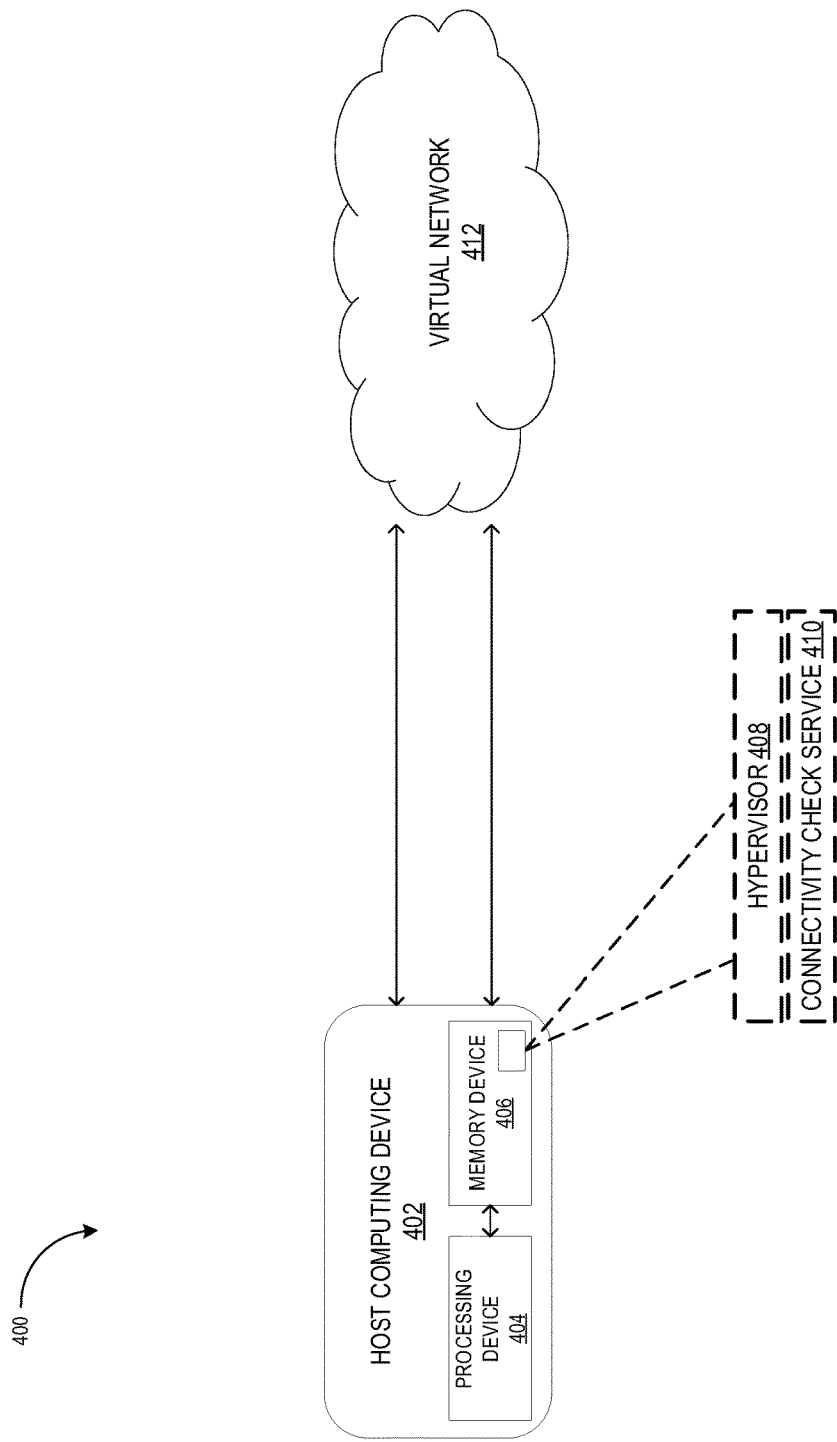
FIG. 4 is another block diagram illustrating an example virtual computing environment, in accordance with the present embodiments.

In certain embodiments, as will be further appreciated with respect to FIGS. 2-4, it may be useful to, for example, automatically configure and test the VMM 124A, 124B, and 124C for network connectivity and/or other requirements prior to runtime. For example, in some embodiments, when logically attaching the VMMs 124A, 124B, and 124C to, for example, the network 102 (e.g., VLAN), the agents 126A, 126B, and 126C (e.g., administrators) may make a number of assumptions, such as that each of the host computing devices 116, 118, and 120 include network connectivity to each other.

In other embodiments, the assumptions may include, for example in implementing a VLAN embodiment of the network 102, that the network 102 is properly defined on the external and/or physical network (e.g., including that the correct tags defined on the relevant ports) supporting the host computing devices 116, 118, and 120. The agent 126A-126C may further assume that any maximum transmission unit (MTU) requirements include proper connectivity paths, that all application connectivity defined by transmission control protocol (TCP)/user datagram protocol (UDP) includes proper ports, and further that the network 102 is capable of supplying the desired bandwidth rate and connectivity quality. In certain embodiments, if any of the aforementioned assumptions are incorrect, the error may not become apparent until network connectivity untimely fails, such as a runtime of the VMMs 124A, 124B, and 124C. It may be thus useful to provide techniques to test the connectivity retirements prior to connecting the VMMs 124A, 124B, and 124C to the network 102 (e.g., VLAN), and to periodically check the connectivity state thereafter.

FIG. 2 depicts an example virtual computing environment 200, which may utilized to reduce or substantially eliminate the possibility of network connectivity between the hypervisors and the network (e.g., VLAN) becoming untimely inoperable or failing at, for example, runtime in accordance with the present embodiments. In certain embodiments, as depicted, the virtual computing environment 200 may include a first host computing device 202, which includes a processing device 204 and a memory device 206; a second host computing device 208, which includes a processing device 210 and a memory device 212; and a third host computing device 214, which includes a processing device 216 and a memory device 218. In certain embodiments, the host computing devices 202, 208, and 214 may each include one or more hypervisors stored on the respective memory devices 206, 212, and 218 that may be utilized to test, for example, whether network connectivity requirements are satisfied for properly connecting the host computing devices 202, 208, and 214 to a network 220 (e.g., VLAN).

For example, in certain embodiments, respective hypervisors running on the host computing devices 202, 208, and 214 may be configured to operate in a master/slave configuration, in which one of the host computing devices 202, 208, and 214 may be determined as the master (e.g., host computing device 202) and the remaining host computing devices (e.g., host computing devices 208 and 214) may be determined as the slaves. For example, during operation, the master hypervisor and host computing device (e.g., host computing device 202) may execute, for example, a network connectivity check service that may be used to collect network connectivity information for the master hypervisor and host computing device (e.g., host computing device 202) and the slave hypervisors and host computing devices (e.g., host computing devices 208 and 214) and perform iterative network connectivity checks for each of the host computing devices 202, 208, and 214 and associated hypervisors.

For example, in some embodiments, the master hypervisor and host computing device (e.g., host computing device 202) may establish or cause to be established one or more communication channels 222, 224, and 226 (e.g., TCP/UDP), and ping each of the slave hypervisors and host computing devices (e.g., host computing devices 208 and 214) to determine connectivity of the slave hypervisors and host computing devices (e.g., host computing devices 208 and 214) to the network 220 (e.g., VLAN based on the response thereto.

In another embodiment, the master hypervisor and host computing device (e.g., host computing device 202) may scan for a message (e.g., "Hello") (e.g., in response to one or more pings) from each of the slave hypervisors and host computing devices (e.g., host computing devices 208 and 214) to determine connectivity of the slave hypervisors and host computing devices (e.g., host computing devices 208 and 214) to the network 220 (e.g., VLAN) utilizing, for example, a layer 2 (L2) multicast frame. In other embodiments, the master hypervisor and host computing device (e.g., host computing device 202) may determine whether the proper peer ports (e.g., with respect to the physical network underlying the host computing devices 202, 208, and 214) associated with the master hypervisor and host computing device (e.g., host computing device 202) and each of the slave hypervisors and host computing devices (e.g., host computing devices 208 and 214) are connectable to the virtual network. The master hypervisor and host computing device (e.g., host computing device 202) may also execute an application connectivity checker that may confirm that, for example, MTU requirements include proper connectivity paths, and that all application connectivity defined by transmission control protocol TCP/UDP includes proper ports.

Specifically, in sum, the network connectivity check service executed, for example, by the processing device 204 of the master hypervisor and host computing device (e.g., host computing device 202) may perform a check to determine that connectivity requirements (e.g., application connectivity, bandwidth rate, connectivity quality, MTU connectivity path, aggregation, and so forth) are satisfied for properly connecting the master hypervisor and host computing device (e.g., host computing device 202) and each of the slave hypervisors and host computing devices (e.g., host computing devices 208 and 214) to the network 220 (e.g., VLAN).

In certain embodiments, once the master hypervisor and host computing device (e.g., host computing device 202) determines that the one or more connectivity requirements (e.g., application connectivity, bandwidth rate, connectivity quality, MTU connectivity path, aggregation, and so forth) are satisfied, the master hypervisor and host computing device (e.g., host computing device 202) and each of the slave hypervisors and host computing devices (e.g., host computing devices 208 and 214) may be connected to the network 220 (e.g., VLAN). The master hypervisor and host computing device (e.g., host computing device 202) may then perform periodic connectivity checks (e.g., iteratively check the connectivity per every half-hour, per every 1 hour, per every 3 hours, per every 6 hours, per every 12 hours, per every 24 hours, and so on and so forth) of the connection (e.g., virtual network attachment) between the master hypervisor and host computing device (e.g., host computing device 202) and each of the slave hypervisors and host computing devices (e.g., host computing devices 208 and 214) to the network 220 (e.g., VLAN).

On the other hand, should the master hypervisor and host computing device (e.g., host computing device 202) determines that the one or more connectivity requirements (e.g., application connectivity, bandwidth rate, connectivity quality, MTU connectivity path, aggregation, and so forth) are not satisfied, any request to connect (e.g., attached) the master hypervisor and host computing device (e.g., host computing device 202) and each of the slave hypervisors and host computing devices (e.g., host computing devices 208 and 214) to the network 220 (e.g., VLAN) may be denied, unless for, example, the connection (virtual network attachment) is performed by brut-force.

In one embodiment, the master hypervisor and host computing device (e.g., host computing device 202) may also generate a graphical map (e.g., to be presented on an electronic display to a user or other operator) of, for example, the master hypervisor and host computing device (e.g., host computing device 202) and each of the slave hypervisors and host computing devices (e.g., host computing devices 208 and 214) (or a cluster of host computing devices and associated hypervisors) that were determined to be connectable to the network 220 (e.g., VLAN). In this way, the present techniques may reduce or substantially eliminate the possibility of the connection between the host computing devices 2021, 208, and 214 and associated hypervisors and the network 220 (e.g., VLAN) becoming untimely inoperable or failing at, for example, runtime of the host computing devices 2021, 208, and 214 and associated hypervisors.

Turning now to FIG. 3, which illustrates is a flow diagram of a method 300 of dynamic network connectivity verification in virtual computing environments in accordance with the present embodiments. The method 300 may also be performed by processing logic (e.g., processing device 204 of the host computing device 202) that may include hardware (e.g., circuitry, dedicated logic, programmable logic, one or more processors, one or more processing devices, a central processing unit (CPU), a system-on-chip (SoC), etc.), software (e.g., instructions running/executing on a processing device), firmware (e.g., microcode), or various combinations thereof.

The method 300 may begin at block 302 with a processing device (e.g., processing device 204) receiving a request to connect a hypervisor of a host computing device to a virtual network (e.g., first server device 302). The method 300 may continue at block 304 with the processing device (e.g., processing device 204) determining whether the hypervisor is connectable to the virtual network utilizing at least one connectivity check service (e.g., second server device 304). The method 300 may then continue at block 306 with the processing device (e.g., processing device 204) connecting the hypervisor to the virtual network when one or more connectivity requirements are satisfied. The method 300 may then conclude at block 308 with the processing device (e.g., processing device 204) performing a periodic connectivity check (e.g., iteratively check the connectivity per every half-hour, per every 1 hour, per every 3 hours, per every 6 hours, per every 12 hours, per every 24 hours, and so on and so forth) of the connection (e.g., virtual network attachment) between the hypervisor and the virtual network. In this way, the present techniques may reduce or substantially eliminate the possibility of a connection between a host computing device and associated hypervisor and a virtual network (e.g., VLAN) becoming untimely inoperable or failing at, for example, runtime of the host computing device and associated hypervisor.

FIG. 4 illustrates an apparatus 400 of an example virtual computing environment, in accordance with the present embodiments. As depicted, the apparatus 400 may include a first host computing device 402, which may include a processing device 404 and a memory 406. In certain embodiments, the host computing device 402 may include a hypervisor 408 and a connectivity check service 410 stored on the memory 406 that may be utilized to test, for example, whether network connectivity requirements are satisfied for properly connecting the hypervisor 408 to a virtual network 412 (e.g., VLAN).

For example, during operation, the processing device 404 of the host computing device 402 may determine whether the hypervisor 408 (e.g., that may be stored on the memory 406) is connectable to the virtual network 412 (e.g., VLAN) utilizing, for example, the network connectivity check service 410 executed by the processing device 404. In some embodiments, the network connectivity check service 410 executed by the processing device 404 may include a determination of whether one or more connectivity requirements (e.g., application connectivity, bandwidth rate, connectivity quality, MTU connectivity path, aggregation, and so forth) are satisfied for properly connecting the hypervisor 408 to the virtual network 412 (e.g., VLAN).

Once the processing device 404 determines that the one or more connectivity requirements (e.g., application connectivity, bandwidth rate, connectivity quality, MTU connectivity path, aggregation, and so forth) are satisfied for properly connecting the hypervisor 408 to the virtual network 412 (e.g., VLAN), the processing device 404 may cause the hypervisor 408 to be connected to the virtual network 412 (e.g., VLAN). The processing device 404 may then perform a periodic connectivity check (e.g., iteratively check the connectivity per every half-hour, per every 1 hour, per every 3 hours, per every 6 hours, per every 12 hours, per every 24 hours, and so on and so forth) of the connection (e.g., virtual network connection) between the hypervisor 408 and the virtual network 412. In this way, the present techniques may reduce or substantially eliminate the possibility of the connection between the hypervisor 408 and the virtual network 412 (e.g., VLAN) becoming untimely inoperable or failing at, for example, runtime of the hypervisor 408.

Figure 5:
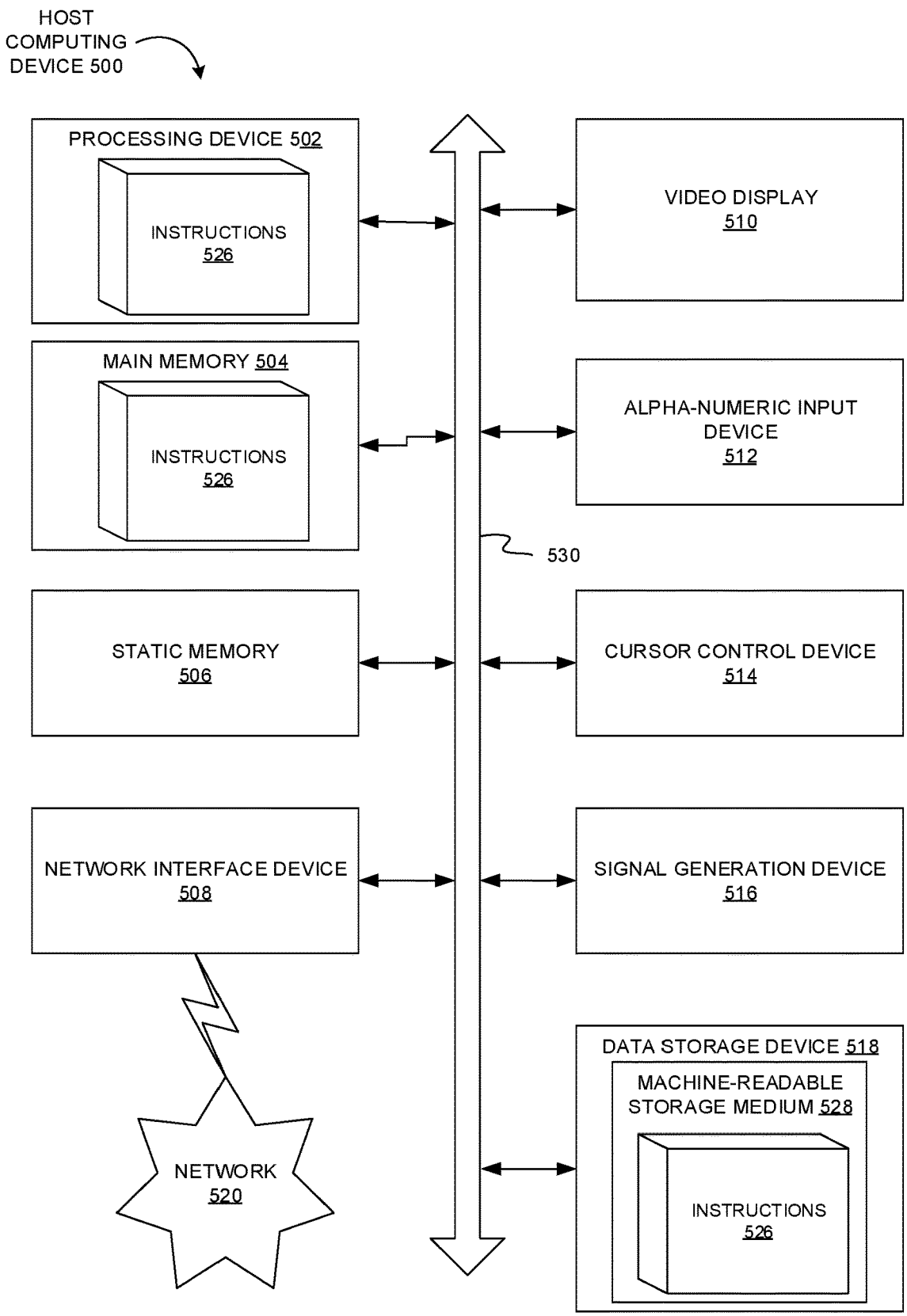
FIG. 5 is a block diagram of an example computing device that may perform one or more of the operations described herein, in accordance with the present embodiments.

FIG. 5 is a block diagram of an example host computing device 500 that may perform one or more of the operations described herein, in accordance with some embodiments. The host computing device 500 may be connected to other computing devices in a LAN, an intranet, an extranet, and/or the Internet. The host computing device 500 may operate in the capacity of a server machine in client-server network environment or in the capacity of a client in a peer-to-peer network environment. The host computing device 500 may be provided by a personal computer (PC), a set-top box (STB), a server, a network router, switch or bridge, or any machine capable of executing a set of instructions (sequential or otherwise) that specify actions to be taken by that machine. Further, while only a single host computing device 500 is illustrated, the term "computing device" shall also be taken to include any collection of computing devices that individually or jointly execute a set (or multiple sets) of instructions to perform the methods discussed herein.

The example host computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

The host computing device 500 may further include a network interface device 408 which may communicate with a network 520. The host computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 410, alphanumeric input device 512, and cursor control device 514 may be combined into a single component or device (e.g., an LCD touch screen).

The data storage device 518 may include a computer-readable storage medium 528 on which may be stored one or more sets of instructions, e.g., instructions for carrying out the operations described herein, in accordance with one or more aspects of the present disclosure. Instructions implementing module 526 may also reside, completely or at least partially, within main memory 504 and/or within processing device 502 during execution thereof by host computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc.

Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus, comprising:
a memory of a host computing device, the memory to store at least one hypervisor; and
a processing device of the host computing device and operatively coupled to the memory, the processing device to:
  receive a request to connect a first hypervisor to a virtual network, the first hypervisor to operate as a master of at least one additional hypervisor to be connected to the virtual network;
  establish, by the first hypervisor, one or more communication channels with the at least one additional hypervisor to be connected to the virtual network prior to connecting the first hypervisor to the virtual network;
  perform, via the communication channel, a connectivity check between the first hypervisor and the at least one additional hypervisor, wherein the processing device is to:
    collect, by the first hypervisor executing a connectivity check service, network connectivity information for the first hypervisor and the at least one additional hypervisor of the virtual network, wherein to collect the network connectivity information the first hypervisor is to:
      ping each additional hypervisor and scan for a message from the additional hypervisor; and
      determine whether peer ports associated with the first hypervisor and each additional hypervisor are available for operation of the virtual network and are available to be connected to the virtual network; and
    determine, in view of the network connectivity information, whether a connection between the first hypervisor and the at least one additional hypervisor is sufficient for operation of the virtual network, wherein the connection is sufficient for operation of the virtual network if the network connectivity information indicates that one or more connectivity requirements are satisfied;
  connect the first hypervisor to the virtual network in response to the one or more connectivity requirements being satisfied; and in response to connecting the first hypervisor to the virtual network, periodically perform the connectivity check between the first hypervisor and the at least one additional hypervisor to determine whether the connection between the first hypervisor and the at least one additional hypervisor remains sufficient for operation of the virtual network.

2. The apparatus of claim 1, wherein the processing device is further to:
generate a graphical map of the first hypervisor and the at least one additional hypervisor of a plurality of host computing devices determined to be connectable to the virtual network; and
provide the graphical map to be displayed on a user device.

3. The apparatus of claim 1, wherein to determine whether the first hypervisor is connectable to the virtual network, the processing device is to determine, based on the network connectivity information and the one or more connectivity requirements, whether a second hypervisor of a second host computing device is connectable to the virtual network.

4. The apparatus of claim 3, wherein the processing device is to determine, based on the network connectivity information and the one or more connectivity requirements, whether the second hypervisor is connectable to the virtual network before connecting the first hypervisor to the virtual network.

5. The apparatus of claim 1, wherein to perform the connectivity check of the connection, the processing device is to execute an application connectivity checker, the application connectivity checker comprising a transmission control protocol (TCP) ping of each of the at least one additional hypervisor of a plurality of host computing devices to determine connectivity of the at least one additional hypervisor to the virtual network.

6. A method, comprising:
receiving a request to connect a first hypervisor to a virtual network, the first hypervisor to operate as a master of at least one additional hypervisor to be connected to the virtual network;
establishing, by the first hypervisor, one or more communication channels with the at least one additional hypervisor to be connected to the virtual network prior to connecting the first hypervisor to the virtual network;
performing, via the communication channel, a connectivity check between the first hypervisor and the at least one additional hypervisor, wherein the connectivity check comprises:
collecting, by the first hypervisor executing a connectivity check service, network connectivity information for the first hypervisor and the at least one additional hypervisor, wherein to collect the network connectivity information the first hypervisor is to:
ping each additional hypervisor and scan for a message from the additional hypervisor; and
determine whether peer ports associated with the first hypervisor and each additional hypervisor are available for operation of the virtual network; and
determining, in view of the network connectivity information, whether a connection between the first hypervisor and the at least one additional hypervisor is sufficient for operation of the virtual network, wherein the connection is sufficient for operation of the virtual network if the network connectivity information indicates that one or more connectivity requirements are satisfied;
connecting the first hypervisor to the virtual network in response to the one or more connectivity requirements being satisfied; and
in response to connecting the first hypervisor to the virtual network, periodically performing the connectivity check of the connection between the first hypervisor and the at least one additional hypervisor to determine whether the connection between the first hypervisor and the at least one additional hypervisor remains sufficient for operation of the virtual network.

7. The method of claim 6, wherein performing the connectivity check of the connection further comprises generating a graphical map of the first hypervisor and the at least one additional hypervisor of a plurality of host computing devices determined to be connectable to the virtual network; and
provide the graphical map to be displayed on a user device.

8. The method of claim 6, wherein performing the connectivity check of the connection comprises executing an application connectivity checker, the application connectivity checker comprising a transmission control protocol (TCP) ping of each of the at least one additional hypervisor of a plurality of host computing devices to determine connectivity of the at least one additional hypervisor to the virtual network.

9. A non-transitory computer-readable storage medium including instructions that, when executed by a processing device, cause the processing device to:
receive a request to connect a first hypervisor to a virtual network, the first hypervisor to operate as a master of at least one additional hypervisor to be connected to the virtual network;
establish, by the first hypervisor, one or more communication channels with the at least one additional hypervisor to be connected to the virtual network prior to connecting the first hypervisor to the virtual network;
perform, via the communication channel, a connectivity check between the first hypervisor and the at least one additional hypervisor, wherein the processing device is to:
collect, by the first hypervisor executing a connectivity check service, network connectivity information for the first hypervisor and the at least one additional hypervisor of the virtual network, wherein to collect the network connectivity information the first hypervisor is to:
ping each additional hypervisor and scan for a message from the additional hypervisor; and
determine whether peer ports associated with the first hypervisor and each additional hypervisor are available for operation of the virtual network; and
determine, in view of the network connectivity information, whether a connection between the first hypervisor and the at least one additional hypervisor is sufficient for operation of the virtual network, wherein the connection is sufficient for operation of the virtual network if the network connectivity information indicates that one or more connectivity requirements are satisfied;
connect the first hypervisor to the virtual network in response to the one or more connectivity requirements being satisfied; and
in response to connecting the first hypervisor to the virtual network, periodically perform the connectivity check of the connection between the first hypervisor and the at least one additional hypervisor to determine whether the connection between the first hypervisor and the at least one additional hypervisor remains sufficient for operation of the virtual network.

10. The non-transitory computer-readable storage medium of claim 9, to perform the connectivity check of the connection, the processing device is to execute an application connectivity checker, the application connectivity checker comprising a transmission control protocol (TCP) ping of each of the at least one additional hypervisor of a plurality of host computing devices to determine connectivity of the at least one additional hypervisor to the virtual network.

11. The non-transitory computer-readable storage medium of claim 9, to perform the connectivity check of the connection, the processing device is to generate a graphical map of each of the first hypervisor and the at least one additional hypervisor of a plurality of host computing devices determined to be connectable to the virtual network.

\* \* \* \* \*